(12) United States Patent
Wilson et al.

(10) Patent No.: US 9,208,597 B2
(45) Date of Patent: Dec. 8, 2015

(54) GENERALIZED INSTANCING FOR THREE-DIMENSIONAL SCENE DATA

(71) Applicant: DreamWorks Animation LLC, Glendale, CA (US)

(72) Inventors: Robert Giles Wilson, Burbank, CA (US); David Moore, Glendale, CA (US); Nick Long, Glendale, CA (US)

(73) Assignee: DreamWorks Animation LLC, Glendale, CA (US)

( * ) Notice: Subject to any disclaimer, the term of this patent is extended or adjusted under 35 U.S.C. 154(b) by 276 days.

(21) Appl. No.: 13/844,380

(22) Filed: Mar. 15, 2013

(65) Prior Publication Data

US 2014/0267239 A1 Sep. 18, 2014

(51) Int. Cl.
*G06T 15/00* (2011.01)
*G06T 13/20* (2011.01)
*G06T 17/00* (2006.01)

(52) U.S. Cl.
CPC ............... *G06T 13/20* (2013.01); *G06T 15/00* (2013.01); *G06T 17/005* (2013.01); *G06T 2210/61* (2013.01)

(58) Field of Classification Search
None
See application file for complete search history.

(56) References Cited

U.S. PATENT DOCUMENTS

| | | | |
|---|---|---|---|
| 4,922,413 A | 5/1990 | Stoughton et al. | |
| 5,329,360 A | 7/1994 | Gillard et al. | |
| 5,675,752 A | 10/1997 | Scott et al. | |
| 5,808,617 A | 9/1998 | Kenworthy et al. | |
| 5,808,625 A | 9/1998 | Picott et al. | |
| 5,896,139 A | 4/1999 | Strauss | |
| 5,982,389 A | 11/1999 | Guenter et al. | |
| 5,986,667 A | 11/1999 | Jevans | |
| 6,154,215 A | 11/2000 | Hopcroft et al. | |
| 6,243,856 B1 | 6/2001 | Meyer et al. | |

(Continued)

FOREIGN PATENT DOCUMENTS

| | | | |
|---|---|---|---|
| EP | 1918880 A2 | 5/2008 | |
| EP | 1918881 A2 | 5/2008 | |

(Continued)

OTHER PUBLICATIONS

Josie Wernecke, "The Inventor Mentor: Programming Object-Oriented 3D Graphics with Open Inventor™, Release 2", 1994, Addison-Wesley Publishing Company, "Chapter 3. Nodes and Groups".*

(Continued)

*Primary Examiner* — David H Chu
(74) *Attorney, Agent, or Firm* — Morrison & Foerster LLP

(57) ABSTRACT

Systems and methods for rendering three-dimensional images by instancing scene description data using a hierarchy are provided. A hierarchy is accessed. The hierarchy comprises a first node and an instance node. The first node is a predecessor to a subtree of one or more nodes and the first node is associated with a first scene description data object. The instance node is a leaf of the hierarchy. The instance node has a parent node and the instance node is associated with a second scene description data object. The parent node has successor nodes other than the instance node. An instancing instruction of the instance node is read. The instancing instruction comprises information identifying the first node. An instance of the subtree of one or more nodes is merged at a location in the hierarchy of the instance node. An image is rendered based on the merged instance of the subtree.

18 Claims, 12 Drawing Sheets
(1 of 12 Drawing Sheet(s) Filed in Color)

(56) References Cited

U.S. PATENT DOCUMENTS

| | | | |
|---|---|---|---|
| 6,252,608 B1 | 6/2001 | Snyder et al. | |
| 6,263,103 B1 | 7/2001 | Freeman et al. | |
| 6,272,650 B1* | 8/2001 | Meyer et al. | 714/38.14 |
| 6,496,190 B1 | 12/2002 | Driemeyer et al. | |
| 6,556,200 B1 | 4/2003 | Pfister et al. | |
| 6,611,262 B1 | 8/2003 | Suzuki | |
| 6,760,485 B1 | 7/2004 | Gilman et al. | |
| 6,919,891 B2 | 7/2005 | Schneider et al. | |
| 7,174,039 B2 | 2/2007 | Koo et al. | |
| 7,414,626 B1 | 8/2008 | Picott | |
| 7,439,982 B2* | 10/2008 | Deniau et al. | 345/581 |
| 7,548,238 B2 | 6/2009 | Berteig et al. | |
| 7,911,472 B2 | 3/2011 | Harper | |
| 7,920,143 B1 | 4/2011 | Haratsch et al. | |
| 8,009,176 B2 | 8/2011 | Zimmer | |
| 8,259,110 B1 | 9/2012 | Carr et al. | |
| 8,274,506 B1 | 9/2012 | Rees | |
| 8,339,402 B2 | 12/2012 | Henson et al. | |
| 8,352,397 B2 | 1/2013 | Rubin et al. | |
| 8,352,443 B1 | 1/2013 | Polson et al. | |
| 8,369,564 B2 | 2/2013 | Hervas et al. | |
| 8,612,485 B2 | 12/2013 | Selan et al. | |
| 8,624,898 B1 | 1/2014 | Bugaj et al. | |
| 8,773,433 B1 | 7/2014 | Smyrl | |
| 2001/0027388 A1 | 10/2001 | Beverina et al. | |
| 2002/0063704 A1 | 5/2002 | Sowizral et al. | |
| 2002/0099684 A1 | 7/2002 | Ardoin et al. | |
| 2002/0128841 A1* | 9/2002 | Kibre et al. | 704/260 |
| 2002/0140707 A1 | 10/2002 | Samra et al. | |
| 2002/0163518 A1 | 11/2002 | Rising, III et al. | |
| 2002/0188613 A1* | 12/2002 | Chakraborty et al. | 707/100 |
| 2003/0156117 A1 | 8/2003 | Higuchi et al. | |
| 2004/0052450 A1 | 3/2004 | Morrison | |
| 2004/0109501 A1* | 6/2004 | Wollborn | 375/240.08 |
| 2004/0160445 A1 | 8/2004 | Whatmough | |
| 2004/0189668 A1 | 9/2004 | Beda et al. | |
| 2004/0194020 A1* | 9/2004 | Beda et al. | 715/502 |
| 2004/0222989 A1 | 11/2004 | Zhang et al. | |
| 2004/0222992 A1 | 11/2004 | Calkins et al. | |
| 2005/0039176 A1 | 2/2005 | Fournie et al. | |
| 2005/0110790 A1 | 5/2005 | D'Amora | |
| 2005/0140694 A1 | 6/2005 | Subramanian et al. | |
| 2005/0256950 A1 | 11/2005 | Suzuki | |
| 2005/0262470 A1 | 11/2005 | Gavrilov | |
| 2006/0176403 A1* | 8/2006 | Gritton et al. | 348/581 |
| 2007/0080964 A1 | 4/2007 | Kainz et al. | |
| 2007/0176926 A1 | 8/2007 | Garcia et al. | |
| 2007/0185881 A1 | 8/2007 | Vienneau et al. | |
| 2008/0028414 A1 | 1/2008 | Couture-Gagnon et al. | |
| 2008/0049033 A1 | 2/2008 | Yang | |
| 2008/0117216 A1 | 5/2008 | Dorie | |
| 2008/0122838 A1* | 5/2008 | Hoover et al. | 345/420 |
| 2008/0231633 A1 | 9/2008 | Keller et al. | |
| 2008/0238916 A1 | 10/2008 | Ghosh et al. | |
| 2008/0278482 A1* | 11/2008 | Farmanbar et al. | 345/419 |
| 2009/0021513 A1 | 1/2009 | Joshi et al. | |
| 2009/0027380 A1 | 1/2009 | Rajan et al. | |
| 2010/0079462 A1 | 4/2010 | Breeds et al. | |
| 2010/0123723 A1 | 5/2010 | Collard et al. | |
| 2010/0134501 A1 | 6/2010 | Lowe et al. | |
| 2010/0177104 A1* | 7/2010 | Dufour et al. | 345/522 |
| 2010/0214284 A1 | 8/2010 | Rieffel et al. | |
| 2010/0214313 A1 | 8/2010 | Herman et al. | |
| 2010/0289804 A1 | 11/2010 | Jackman et al. | |
| 2010/0302249 A1 | 12/2010 | Fowler et al. | |
| 2010/0322358 A1 | 12/2010 | Drumm et al. | |
| 2011/0090236 A1 | 4/2011 | Calsyn et al. | |
| 2011/0106843 A1 | 5/2011 | Pan et al. | |
| 2011/0181606 A1 | 7/2011 | Sumner et al. | |
| 2011/0182479 A1 | 7/2011 | Sese et al. | |
| 2011/0206200 A1 | 8/2011 | Sovio et al. | |
| 2011/0234587 A1 | 9/2011 | Maigret et al. | |
| 2011/0316854 A1* | 12/2011 | Vandrovec | 345/420 |
| 2012/0095745 A1 | 4/2012 | Le Guevel-Scholtens et al. | |
| 2012/0166446 A1 | 6/2012 | Bowman et al. | |
| 2012/0280991 A1 | 11/2012 | Maloney et al. | |
| 2012/0280995 A1 | 11/2012 | Anderson | |
| 2012/0284664 A1 | 11/2012 | Zhao | |
| 2013/0090850 A1 | 4/2013 | Mays | |
| 2013/0120421 A1 | 5/2013 | Maguire | |
| 2013/0120422 A1 | 5/2013 | Rao et al. | |
| 2013/0127891 A1 | 5/2013 | Kim et al. | |
| 2014/0035908 A1 | 2/2014 | Powell et al. | |
| 2014/0059564 A1 | 2/2014 | Vigneras et al. | |
| 2014/0108485 A1 | 4/2014 | Geibel et al. | |

FOREIGN PATENT DOCUMENTS

| | | |
|---|---|---|
| EP | 2779100 A1 | 9/2014 |
| WO | 01/63561 A1 | 8/2001 |
| WO | 2007/146800 A2 | 12/2007 |
| WO | 2007/146800 A3 | 11/2008 |
| WO | 2012/174128 A1 | 12/2012 |

OTHER PUBLICATIONS

International Search Report and Written Opinion received for PCT Patent Application No. PCT/US2014/026792, mailed on Aug. 11, 2014, 7 pages.

International Search Report & Written Opinion received for PCT Patent Application No. PCT/US2014/026799, mailed on Sep. 26, 2014, 11 pages.

Non Final Office Action received for U.S. Appl. No. 13/843,695, mailed on Oct. 22, 2014, 16 pages.

Non Final Office Action received for U.S. Appl. No. 13/844,424, mailed on Oct. 28, 2014, 10 pages.

Barrett et al., "A Monotonic Superclass Linearization for Dylan", Oopsla 96, Jun. 28, 1996, pp. 69-82.

Ex-Parte Quayle Action received for U.S. Appl. No. 13/831,482, mailed on Nov. 24, 2014, 7 pages.

Extended European Search Report received for European Patent Application No. 14160117.9, mailed on May 26, 2014, 7 pages.

Open Inventor Toolkit Tutorial, "Chapter 3. Nodes and Groups and Chapter 4. Cameras and Lights", Available at <http://www-evasion.imag.fr/Membres/Francois.Faure/doc/inventorMentor/sgi_html/ch03.html>, Retrieved on Oct. 18, 2013, 61 pages.

Schmalstieg et al., "Modeling and Rendering of Outdoor Scenes for Distributed Virtual Environments", ACM VRST '97 Lausanne Switzerland, 1997, pp. 209-215.

Sun Microsystems, "Reusing Scene Graphs", Java 3D API Specification, Available at <http://docs.oracle.com/cd/E17802_01/j2se/javase/technologies/desktop/java3d/forDevelopers/j3dguide/SceneGraphSharing.doc.html>, Jun. 1999, pp. 1-11.

"Intro to Animation", Power Point Presentation, available online at <http://visservices.sdsc.edu/courses/maya/spring06/introtoanim.ppt>, accessed on Apr. 30, 2013, 32 pages.

"JUNG (Java Universal Network/Graph) Framework Manual, Filtering", available online at <http://jung.sourceforge.net/doc/manual.html#filter>, retrieved on Apr. 30, 2013, 13 pages.

"WebKit Coordinated Graphics System", available online at <http://trac.webkit.org/wiki/CoordinatedGraphicsSystem>, retrieved on Apr. 30, 2013, 9 pages.

Carstarphen, John, "Lighting Effects in Cinema 4D Animation", available online at <http://www.ehow.com/video_4444919_lighting-effects-cinema-4d-animation.html>, retrieved on Apr. 30, 2013, 2 pages.

Illinois Simulator Lab, "Syzygy Documentation: Programming and Application Frameworks", available online at <http://syzygy.isl.uiuc.edu/szg/doc/Programming.html>, retrieved on Apr. 30, 2013, Dec. 17, 2012, 11 pages.

Lu et al. "Knowledge-Based Digital Media Processing: Generic Object Registration using Multiple Hypotheses Testing in Partition Trees", IEE Proc.-Vis. Image Signal Process, vol. 153, No. 3, Jun. 2006, pp. 323-330.

Oishi et al., "Parallel Alignment of a Large Number of Range Images", Proceedings of the Fourth International Conference on 3-D Digital Imaging and Modeling (3DIM'03), IEEE Computer Society, 2003, 8 pages.

(56) References Cited

OTHER PUBLICATIONS

Techfuels, "The Lighting Scene in 3D Animation", available online at <http://www.techfuels.com/applications/9895-lighting-scene-3d-animation.html>, retrieved on Apr. 30, 2013, 3 pages.
Toon Boom Animation, "Lighting Effects", available online at <http://beta.toonboom.com/home-users/toon-boom-studio/resources/tips-and-tricks/lighting-effects>, retrieved on Apr. 30, 2013, 2 pages.
Van Der Beek, Jelle, "Dependency Graphs in Games", Gamasutra the Art & Business of Making Games, available at <http://www.gamasutra.com/view/feature/131221/dependency_graphs_in_games.php?print=1>, accessed on Apr. 30, 2013, 15 pages.
Invitation to pay additional fees received for PCT Patent Application No. PCT/US2014/026799, mailed on Jul. 25, 2014, 2 pages.
Final Office Action received for U.S. Appl. No. 13/843,695, mailed on Feb. 23, 2015, 21 pages.
Non Final Office Action received for U.S. Appl. No. 13/843,980, mailed on Feb. 5, 2015, 15 pages.
Non Final Office Action received for U.S. Appl. No. 13/844,016, mailed on Feb. 5, 2015, 23 pages.
Non-Final Office Action received for U.S. Appl. No. 13/844,363, mailed on Feb. 24, 2015, 9 pages.
Non-Final Office Action received for U.S. Appl. No. 13/831,309, mailed on Feb. 24, 2015, 8 pages.
Rossler et al., "Dynamic Shader Generation for Flexible Multi-Volume Visualization", IEEE Pacific Visualisation Symposium, Mar. 2008, pp. 17-24.
Final Office Action received for U.S. Appl. No. 13/831,309, mailed on Jun. 5, 2015, 8 pages.
Notice of Allowance received for U.S. Appl. No. 13/831,482, mailed on Mar. 4, 2015, 5 pages.
Non-Final Office Action received for U.S. Appl. No. 13/844,497, mailed on Mar. 13, 2015, 21 pages.
Final Office Action received for U.S. Appl. No. 13/844,424, mailed on Apr. 7, 2015, 10 pages.
Non Final Office Action received for U.S. Appl. No. 13/844,113, mailed on Apr. 10, 2015, 10 pages.
Non-Final Office Action received for U.S. Appl. No. 13/831,482, mailed on Apr. 20, 2015, 8 pages.
Notice of Allowance received for U.S. Appl. No. 13/844,016, mailed on Aug. 21, 2015, 10 pages.
Notice of Allowance received for U.S. Appl. No. 13/831,309, mailed on Jul. 21, 2015, 14 pages.
Final Office Action received for U.S. Appl. No. 13/844,363, mailed on Aug. 6, 2015, 12 pages.
Extended European Search Report (includes Supplementary European Search Report and Search Opinion) received for European Patent Application No. 14160119.5, mailed on Jun. 30, 2015, 11 pages.
"Robocopy.exe Robust File Copy Utility Version XP010", Microsoft Corporation, 2003, pp. 1-35.
Bederson et al., "Toolkit Design for Interactive Structured Graphics", IEEE Transactions on Software Engineering, vol. 30, No. 8, Aug. 2004, pp. 535-546.
Cheng et al., "High-Extensible Scene Graph Framework Based on Component Techniques", Journal of Zhejiang University Science A, vol. 7. No. 7, 2006, pp. 1247-1252.
Dobos et al. "3D Revision Control Framework", Web3D, 2012, pp. 121-129.
Dollner et al., "Object-Oriented 3D Modelling, Animation and Interaction", The Journal of Visualization and Computer Animation, vol. 8, 1997, pp. 33-64.
Tobler, Robert F., "Separating Semantics from Rendering: A Scene Graph Based Architecture for Graphics Applications", Visual Computer, vol. 27, 2011, pp. 687-695.
International Preliminary Report on Patentability received for PCT Patent Application No. PCT/US2014/026792 mailed on Sep. 24, 2015, 6 pages.
International Preliminary Report on Patentability received for PCT Patent Application No. PCT/US2014/026799 mailed on Sep. 24, 2015, 8 pages.

\* cited by examiner

GENERALIZED INSTANCING FOR THREE-DIMENSIONAL SCENE DATA

BACKGROUND

1. Field

The present disclosure relates to computer-generated scene data and, more specifically, to a computer-generated scene data using hierarchy trees.

2. Related Art

A computer-generated animation is typically created by rendering a sequence of images, with each image depicting a computer-generated scene composed of one or more computer-generated objects (e.g., a character, tree, table, or chair). Frequently, the computer-generated images illustrate a scene containing multiples of similar objects (e.g., multiple characters, trees, tables, or chairs). For example, a scene may include hundreds of people sitting in the stands of a stadium at a sporting event or a scene may include a distribution of pine trees to produce a forest effect.

More specifically, when generating a virtual three-dimensional scene that includes a forest of pine trees, it is computationally less expensive to reproduce the same pine tree repeatedly to form the forest than it is to design, develop, maintain, and render hundreds of different trees to form the forest. Reproducing the same pine tree to form the forest is also much less time-consuming for the artist who is designing the scene.

However, it is not aesthetically desirable to have a forest of pine trees where all the pine trees in the forest are identical. Such a homogeneous forest is not realistic and would not be viewed as photorealistic to an observer who views the scene, such as in a rendered animation. Changing even minor details of the pine trees in the forest adds a high degree of realism. For example, changing the color of the trees, the texture of the trees, the number and placement of branches on the trees, and the color of the trees' leaves makes the forest, and therefore the scene including the forest, significantly more realistic.

More generally, the ability to reproduce multiple variations of assorted elements that extend beyond objects in a virtual three-dimensional scene is advantageous. It is therefore desirable to create a generalized system for configuring and managing the reproduction of elements in a computer-generated scene and applying variations to the reproductions.

SUMMARY

Processes for rendering three-dimensional images by instancing scene description data using a hierarchy are described. One example process may include accessing a hierarchy. The hierarchy comprises a first node and an instance node. The first node is a predecessor to a first subtree of one or more nodes and the first node is associated with a first scene description data object. The instance node is a leaf of the hierarchy. The instance node has a parent node and the instance node is associated with a second scene description data object. The parent node has successor nodes other than the instance node. An instancing instruction of the instance node is read. The instancing instruction comprises information identifying the first node. An instance of the first subtree of one or more nodes is merged at a location in the hierarchy of the instance node. An image is rendered based on the merged instance of the first subtree.

Systems and computer-readable storage media for rendering three-dimensional images by instancing scene description data using a hierarchy are also described.

BRIEF DESCRIPTION OF THE FIGURES

The present application can be best understood by reference to the following description taken in conjunction with the accompanying drawing figures, in which like parts may be referred to by like numerals. The patent or application file contains at least one drawing executed in color. Copies of this patent or patent application publication with color drawing(s) will be provided by the Office upon request and payment of the necessary fee.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown, but is to be accorded the scope consistent with the claims.

For descriptive purposes, throughout this disclosure, software, software modules, software objects, and the like may be described as performing various functions. One of ordinary skill in the art, however, will recognize that software may not actively perform any function and instead may include instructions that are executable on a computer processor. As such, although software may be described herein as performing a function, it should be appreciated that a computer processor or other computing device may typically perform those functions attributed herein to software modules or objects by executing computer instructions provided by the software modules or objects.

A computer-generated animation is typically created by rendering a sequence of images, each image depicting a computer-generated scene composed of one or more computer-generated objects. Light sources, materials, textures, and other visual effects may be associated with the computer-generated objects to create a realistic visual appearance for the computer-generated scene. For purposes of this discussion, a computer-generated scene generally refers to the virtual three-dimensional (3D) space that is able to be filmed using a virtual camera, and may also be referred to generically as a scene.

Various embodiments are described below relating to scene description data. The scene description data is structured as a hierarchy tree. The hierarchy tree is used to instance scene description data of a virtual three-dimensional scene. In addition, a variation can be applied to the instanced scene description data. For example, consider a character object that has a skin color characteristic and a hair color characteristic. This character may be instanced to produce a second character. In the second character, a variation can be applied to the skin color characteristic, such as to make the skin darker. As a result, a scene can simultaneously use both characters, with the first character having a lighter skin and the second character having a darker skin.

Figure 1:
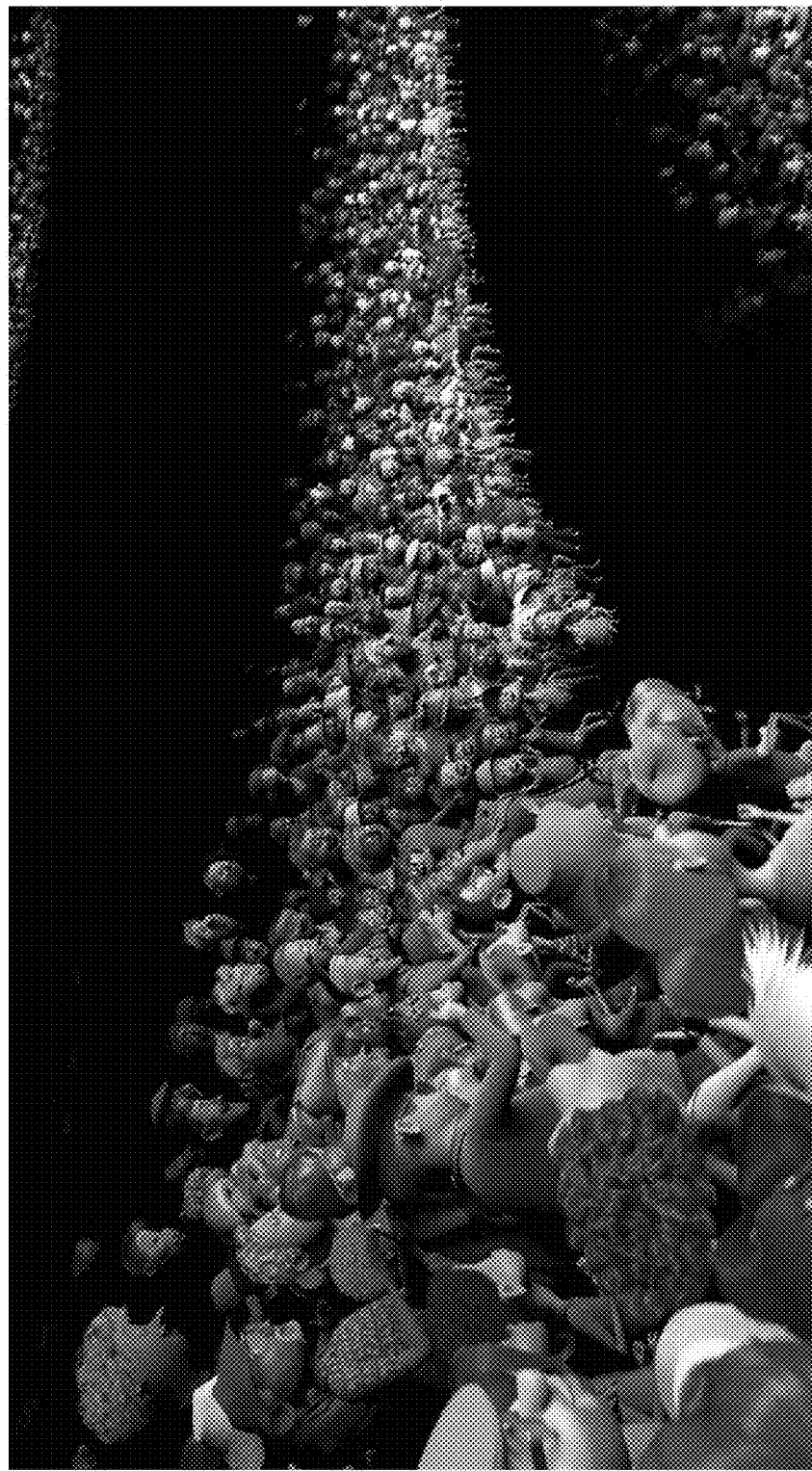
FIG. 1 depicts an exemplary computer-generated image that may be rendered using a hierarchy tree according to various embodiments.

FIG. 1 depicts an exemplary computer-generated image that may be rendered using a hierarchy tree according to various embodiments. Notably, FIG. 1 depicts a scene of a crowd of characters in a stadium. To create such an image, an engineer traditionally individually configures each of the characters to produce the desired crowd. When a shared characteristic of the characters needs to be changed, the engineer must individually make the change for each of the characters. Maintaining the multiple copies of the characters causes the image creation process to be a difficult and burdensome task.

With reference to FIG. 1, rendering the same scene using generalized instancing in a hierarchy tree, an engineer can create additional instances of a character and apply variations to the instanced characters. This technique allows the characters in the crow to share certain characteristics, while enabling the engineer to change individual characteristics of the instanced characters. As a result, less data is stored to represent the crowd of characters and less overhead maintenance of the characters is required. These characters are scene description data.

As described above, the scene description data is structured as a hierarchy tree. The topmost node in the hierarchy tree is called the root node. The root node does not have a parent. Internal nodes of the hierarchy tree are nodes that have one or more children. Leaf nodes of the hierarchy tree are the nodes of the hierarchy tree that do not have children. The leaf nodes of the hierarchy tree represent data (e.g., strings, integers, vectors, or polygon meshes). The internal nodes of the hierarchy tree represent groups of data. For example, leaf nodes may represent geometry meshes, visual effect objects, materials to be applied to geometry, virtual cameras, lighting rigs, light filters, and the like. Edges or links connect various nodes in the hierarchy tree.

FIG. 2 illustrates an exemplary source hierarchy and target hierarchy. The semantics of instancing are described in terms of a transformation between source hierarchy 200 and target hierarchy 220.

Source hierarchy 200 includes root node 202, internal nodes 204-210, and leaf nodes 212-218. Each of nodes 212, 214, and 216 represent scene description data. Node 218 is a leaf node that is an instance node. An instance node includes a special instancing tag. For example, the instance node contains a tag of "instance parent" and a value. This "instance parent" tag may be referred to as an instancing instruction tag. The value of the instance node is a path to another node in the tree to be instanced. Similarly, the instance node may include an instruction to instance another node in the tree and the instance node may specify which node in the tree should be instanced.

As an example, the path to leaf node 216 may be "1,1,2,2." The path is annotated for ease of understanding as follows: 1 [resulting from tag=1 of node 202], 1 [resulting from tag=1 of node 204], 2 [resulting from tag=2 of node 210], 2 [resulting from tag=2 of node 216].

Figure 2A:
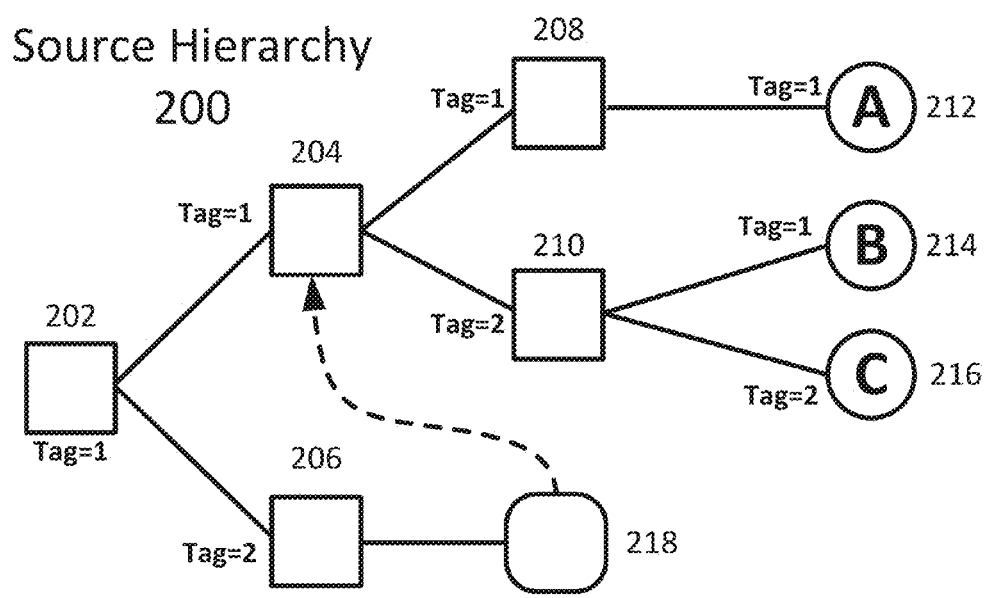
FIGS. 2A-B illustrate an exemplary source hierarchy and target hierarchy.
Figure 2B:
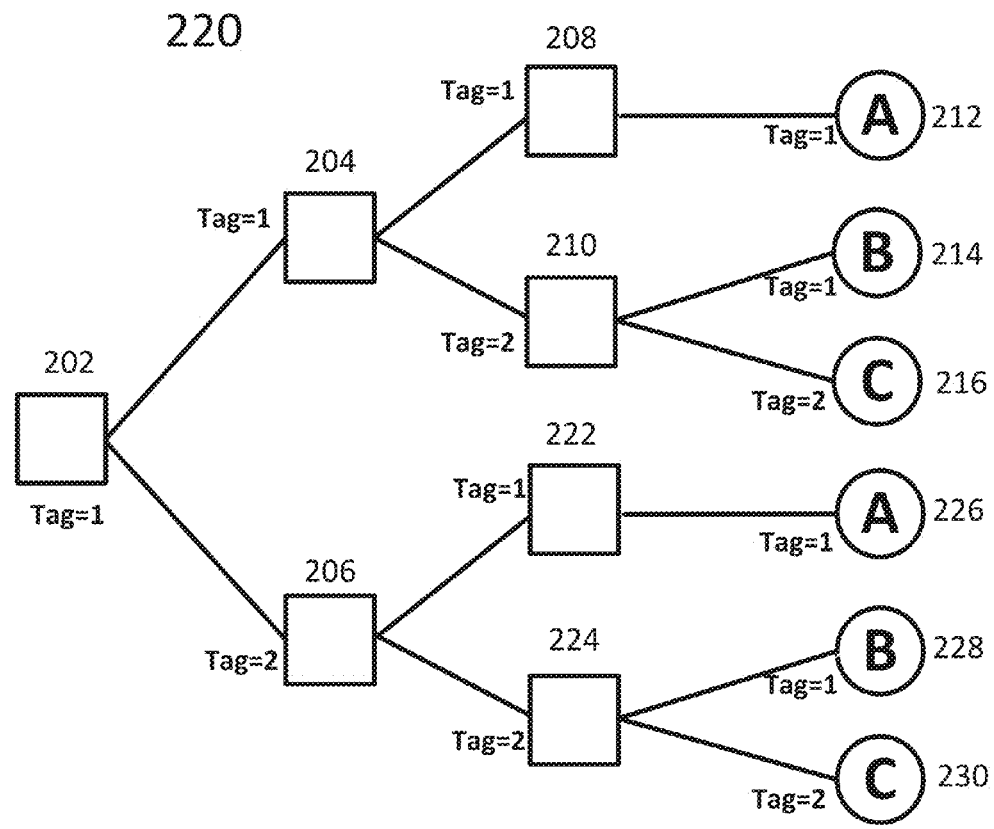

The node to be instanced is called an instance parent node. In the example of FIG. 2A, node 218 is an instance parent node. The instance instruction tag and path to the instance parent node are symbolized by the dashed line from instance node 218 to instance parent node 204. In this example, instance parent node 218 has a path of "1,1." When the instance instruction tag is executed, the path stored in the instance node is traversed and copies of all child nodes of the instance parent node 204 are inserted as siblings of the instance node 218 to produce target hierarchy 220, as illustrated in FIG. 2B. In FIG. 2A, the child nodes of instance parent node 204 are nodes 208-216. The instance node 218 is removed. Phrased differently, the child nodes of the instance parent node 204 replace the instance node 218.

In the example of FIG. 2B, source hierarchy 200 has been executed, resulting in target hierarchy 220. As discussed above, when an instance node is executed, copies of all child nodes of the instance parent node are inserted as siblings of the instance node to produce a target hierarchy. Target hierarchy 220 has a similar structure as source hierarchy 200, with the addition of internal nodes 222 and 224 and leaf nodes 226, 228, and 230. Importantly, instanced leaf nodes 226, 228, and 230 have the same tags, values, and characteristics as leaf nodes 212, 214, and 216, respectively.

When an instance parent node is instanced as a result of an instancing instruction, all child nodes of the instance parent are copied. This copy is a deep copy. A deep copy means that the entire subtree below the instance parent node is copied.

In one example, node 204 of FIG. 2 represents a virtual object to be placed in a virtual scene. Node 204 is a grouping of elements to be used to produce the virtual object. The different elements of the virtual object are represented by leaf nodes 212, 214, and 216. Node 212 represents a geometric mesh of the object, node 214 represents a material property of the object (e.g., the color of the object), and node 216 represents a transform characteristic of the object (e.g., the position, rotation, and scale of the object). As an example, node 214 representing a material property of the object has a value of "B," as illustrated in FIG. 2A.

Node 206 of FIG. 2 represents a second virtual object to be placed in the same scene as the virtual object represented by node 204. When the instancing instruction of instance node 218 is executed, a deep copy of the child nodes of instance parent node 204 occurs. The nodes 208-216 are copied to produce nodes 222-230. Node 206 connects to nodes 222-230 and is associated with the data contained in nodes 226-230. In particular, node 206 is a grouping of elements to be used to produce the virtual object. Node 226 represents a geometric mesh of the object and has the same value as node 212, node 228 represents a material property of the object (e.g., the color of the object) and has the same value as node 214, and node 230 represents a transform characteristic of the object (e.g., the position, rotation, and scale of the object) and has the same value as node 216. As an example, node 228 representing a material property of the object has the same value "B" as node 214, as illustrated in FIG. 2B.

FIG. 3 illustrates an exemplary source hierarchy and target hierarchy for an override of a node. The semantics of instancing are described in terms of a transformation between source hierarchy 300 and target hierarchy 330.

Source hierarchy 300 includes root node 302, internal nodes 304-310 and 320, and leaf nodes 312-318 and 322. Each of nodes 312, 314, 316, and 322 represent scene description data. Node 318 is a leaf node that is an instance node. As illustrated by the dashed line in FIG. 3A, instance node 318 contains a tag of "instance parent" and a value that is a path to the instance parent node 304. For example, the path to the instance parent may be expressed as "1-1." The first "1" identifies node 302 and the second "1" indicates node 304.

Figure 3A:
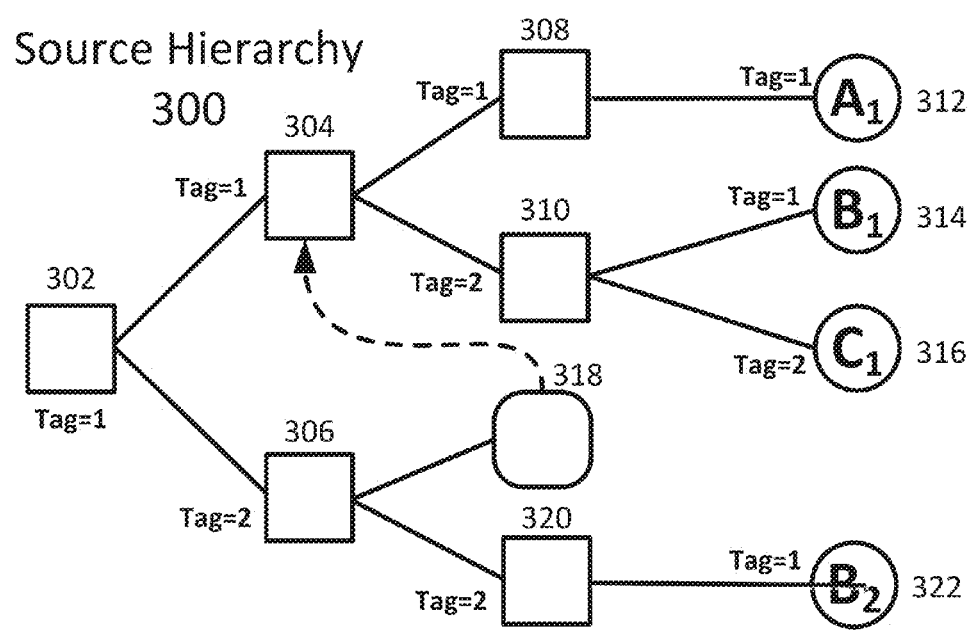
FIGS. 3A-B illustrate an exemplary source hierarchy and target hierarchy for an override of a node.

In contrast to source hierarchy 200 of FIG. 2A, source hierarchy 300 of FIG. 3A includes an instance node 318 that has a sibling. In other words, nodes that represent instancing instructions may have sibling nodes in the source hierarchy. These sibling nodes may be either leaf nodes or internal nodes. As illustrated in FIG. 3A, internal node 320 and instance node 318 are sibling nodes because internal node 320 and instance node 318 share the same direct parent node—node 306.

Figure 3B:
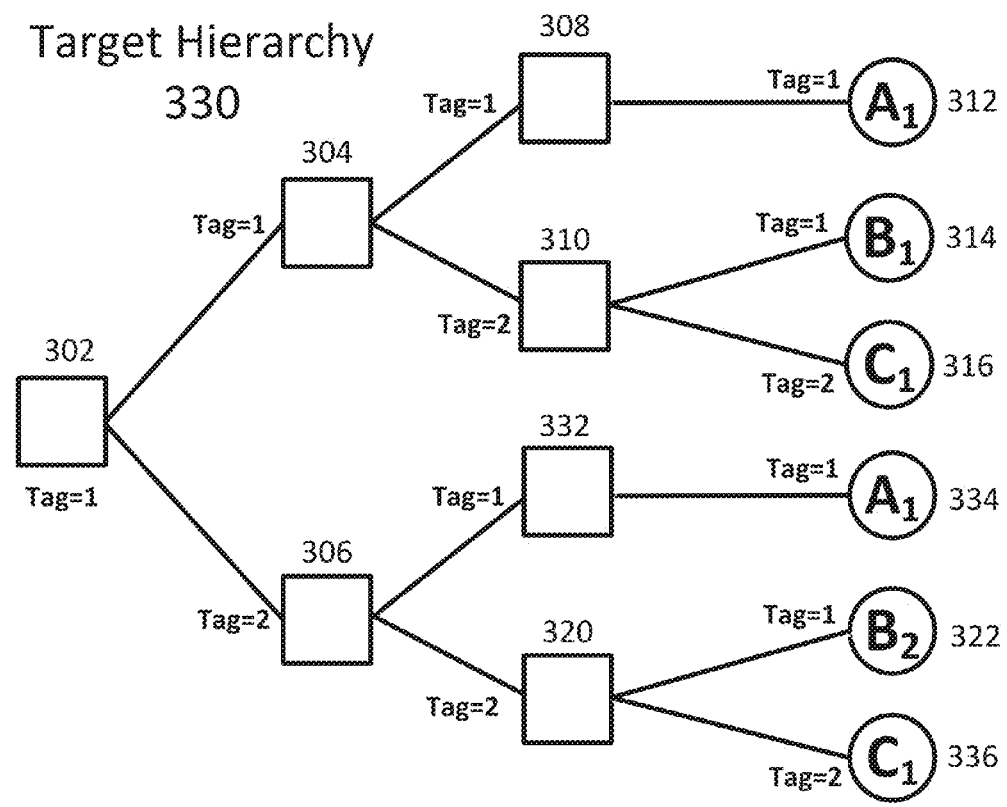

In the example of FIG. 3B, source hierarchy 300 has been executed, resulting in target hierarchy 330. As discussed above, when an instance node is executed, copies of all child nodes of the instance parent node are inserted as siblings of the instance node to produce a target hierarchy. This copy may result in a collision between two or more nodes. Collisions occur when a copied node (resulting from instancing) and a pre-existing node have the same tag (e.g., they describe the same scene description data at the same location in the hierarchy tree). When a collision occurs, child nodes of the instanced parent are merged with the existing nodes to produce the target hierarchy.

We now refer back to FIG. 3A to describe how the child nodes of the instanced parent are merged with the existing nodes to produce target hierarchy 330. Importantly, in this example internal node 320 (tag=2) and internal node 310 (tag=2) have the same tag. As a result, a collision occurs between these two internal nodes when the instancing instruction of instance node 318 is executed. Because both internal node 320 and internal node 310 are non-leaf nodes, their child nodes are merged.

Internal node 320 of the source hierarchy has a child node 322 (tag=1). Internal node 310 (tag=2) has child nodes 314 (tag=1) and 316 (tag=2). When the child nodes of node 310 are merged with the child nodes of 320, another collision occurs. This collision occurs between the copy of leaf node 314 (tag=1), which is being copied to be a direct child of node 320, and leaf node 322 (tag=1). The collision occurs because the copy operation results in two nodes having the same tag value at the same location in the tree. If either node involved in a collision is a leaf node, the collision is resolved in favor of the pre-existing node. In other words, the pre-existing node from the source tree is retained in the target tree. In this example, both nodes involved in the collision are leaf nodes. Therefore, the collision is resolved in favor of leaf node 322. The other child node of node 310, leaf node 316, does not cause a collision and is therefore copied to be a direct child of node 320. This copy of lead node 316 is illustrated in FIG. 3B as leaf node 336. Similarly, node 308 and 312 are copied to the subtree of node 306 as nodes 332 and 334, respectively.

As a result of this merge, pre-existing data in the tree overrides newly copied data and a variation of the subtree of the instance parent node is produced.

Figure 4:
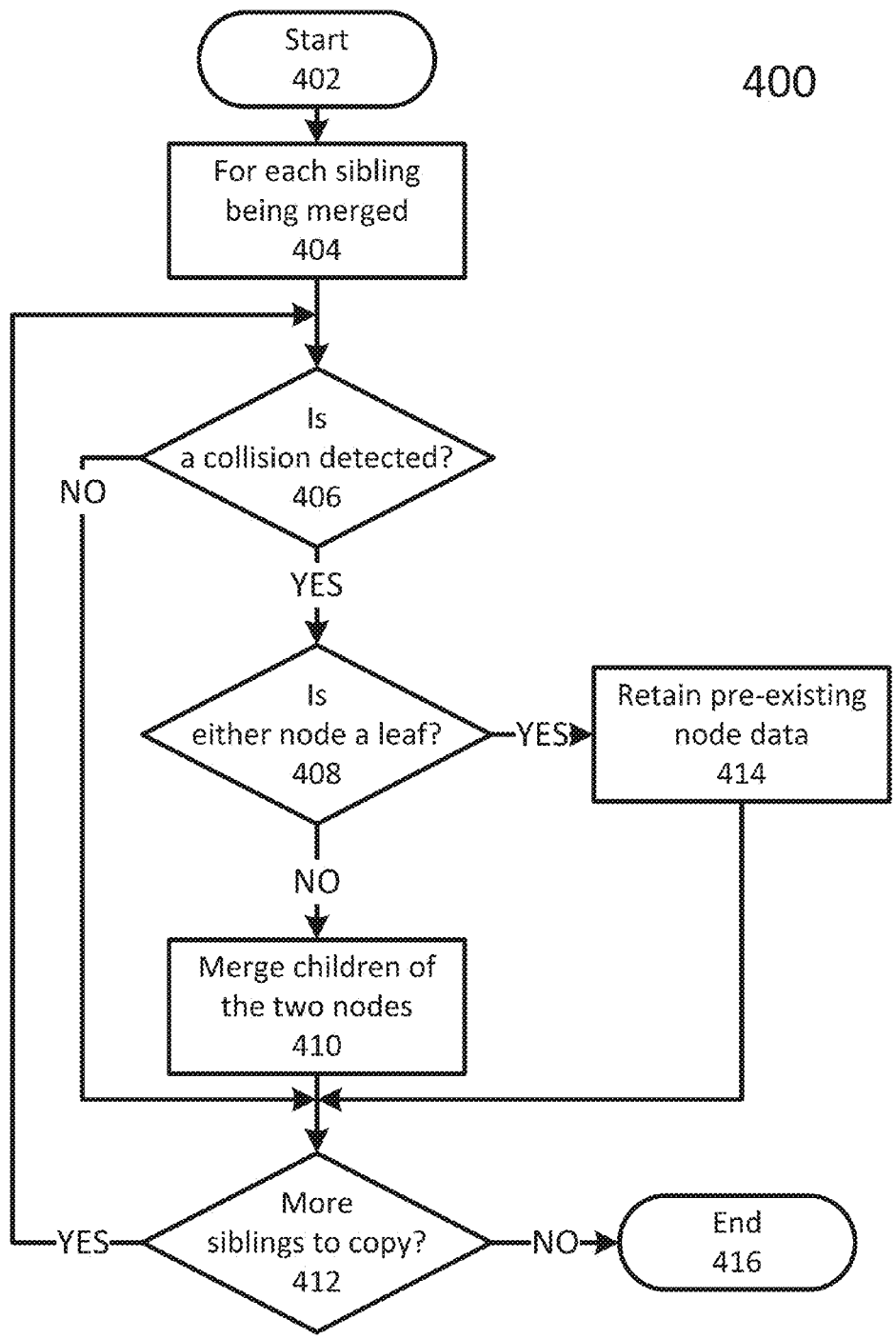
FIG. 4 illustrates an exemplary technique for recursively merging nodes.

FIG. 4 illustrates an exemplary technique for recursively merging nodes. The process starts at block 402. Block 404 indicates that the process is performed for each sibling of the current set of nodes being merged. The technique proceeds to block 406 for a node of the set of nodes being merged. At block 406, if the system detects that the node causes a collision, the process moves to block 408. A collision may be detected by comparing the tag of the node being copied to a particular location of the hierarchy tree with the tags of the pre-existing nodes at the location in the hierarchy tree. If the node being copied has the same tag value as an existing node, the two nodes will cause a collision. At block 408, the system determines if either node that has caused a collision is a leaf node. If either node is a leaf node, the system moves to block 414. If neither node is a leaf node, the system moves to block 410.

At block 414, the system retains the pre-existing node. The node being copied is discarded. In one example, the pre-existing node may be a leaf node that overrides a leaf node or an internal node. In another example, the pre-existing node may be an internal node that overrides a leaf node. The system then moves to block 412.

At block 410, the system calls the process to merge the children of the two nodes. The process of diagram 400 may be called recursively to accomplish this.

At block 412, the system determines if any more sibling nodes remain to be copied. If no siblings remain to be copied, the process ends at block 416. If the system determines that one or more sibling nodes remain to be copied, the system returns to block 404 and progresses with the next sibling node.

Using this override technique, the system can modify any property defined by a leaf node. Further, the system can add additional nodes as part of a merge. An example of adding an additional node is illustrated in FIG. 5.

FIG. 5 illustrates an exemplary source hierarchy and target hierarchy for an override that adds an additional node. The semantics of instancing are described in terms of a transformation between source hierarchy 500 and target hierarchy 530.

Figure 5A:
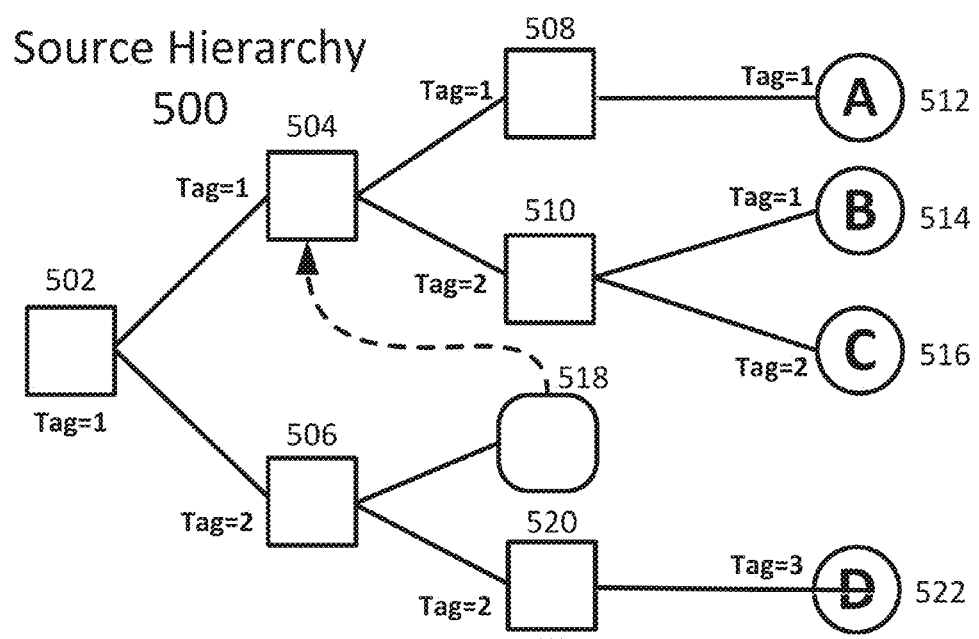
FIGS. 5A-B illustrate an exemplary source hierarchy and target hierarchy for an override that adds an additional node.

In FIG. 5A, source hierarchy 500 includes root node 502, internal nodes 504-510 and 520, and leaf nodes 512-518 and 522. Each of nodes 512, 514, 516, and 522 represent scene description data. Node 518 is a leaf node that is an instance node, as illustrated by the dashed line in FIG. 5A.

Importantly, leaf node 522 has a tag with a value of 3 (tag=3). When instancing occurs in this example, the only collision will be between node 510 and 520. There will not be any collision between node 522 (tag=3) and the copies of nodes 514 (tag=1) and 516 (tag=2).

Figure 5B:
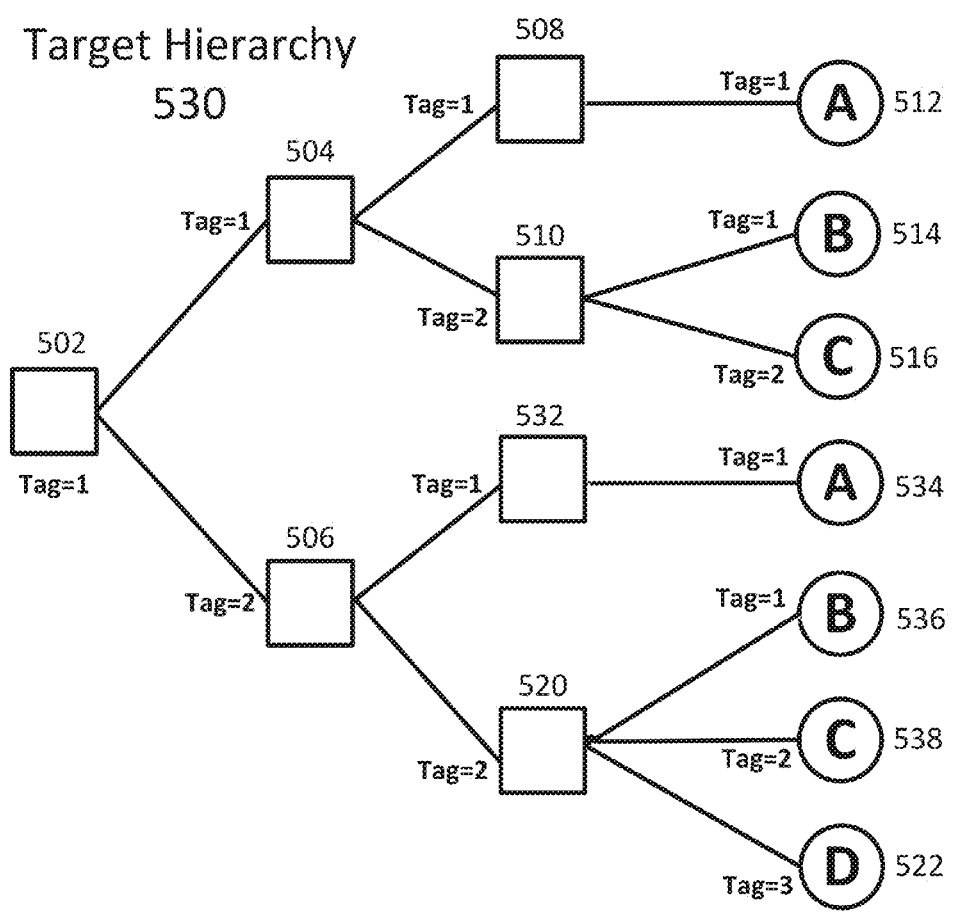

In the example of FIG. 5B, source hierarchy 500 has been executed, resulting in target hierarchy 530. Similar to previous examples, nodes 532, 534, 536, and 538 are populated. However, in this example an additional node is also stored. More specifically, the groups 510 and 520 are identical other than the additional leaf node 522 (tag=3). This example illustrates the concept that additional nodes (and therefore additional scene description data) may be added through the instancing process. Thus, an override may also add nodes because the target hierarchy is a merge of the instance parent copy and the override data (e.g., node 522 of FIG. 5A). For example, a camera rig may be instanced to produce a camera rig, the produced camera rig having a subtree that has an additional node as compared to the original camera rig. This additional node may describe, for example, a camera filter or other scene description data.

An additional property of the system is that leaf nodes can store values that are interpreted as references to other nodes in the hierarchy. For example, this may be achieved by storing a path value that is a sequence of tags, as described above. An absolute reference is a path that is intended to be interpreted from the root node.

However, a path can also be interpreted as a path to be traversed starting from the parent of the leaf node where it is stored. This is called a relative reference and has several useful properties when it is a node that is instanced. For example, an instanced copy of a node containing a relative reference refers to the corresponding instance of the original referenced node, and not to the original node itself. This creates modularity in the system, enabling the generalized instancing of a subtree to behave as expected even when the subtree contains internal references.

Figure 6A:
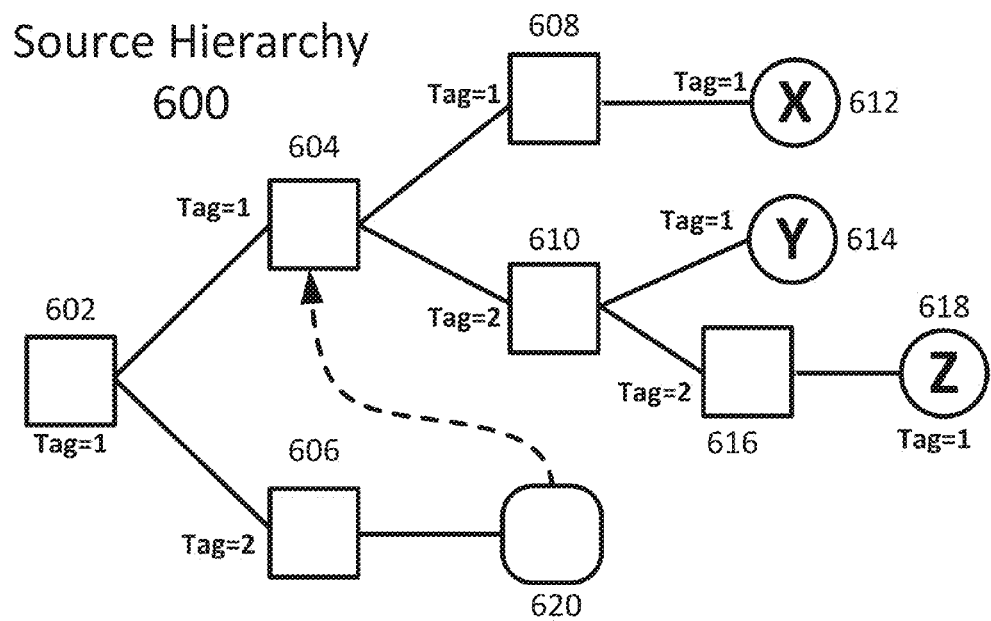
FIGS. 6A-B illustrate an exemplary source hierarchy and target hierarchy for use with absolute and relative paths.

FIG. 6 illustrates an exemplary source hierarchy and target hierarchy for use with absolute and relative paths. In FIG. 6A, source hierarchy 600 includes root node 602, internal nodes 604-610 and 616, and leaf nodes 612, 614, 618, and 620. Node 620 is a leaf node that is an instance node, as illustrated by the dashed line in FIG. 6A.

Leaf node 614 may include a reference to node 618. This reference is stored as a path. As discussed above, the path can be absolute or relative. An absolute reference results in every instance of leaf node 614 referencing node 618. A relative reference results in every instance of leaf node 614 referencing the node that is situated at the same path as relative to node 614.

Figure 6B:
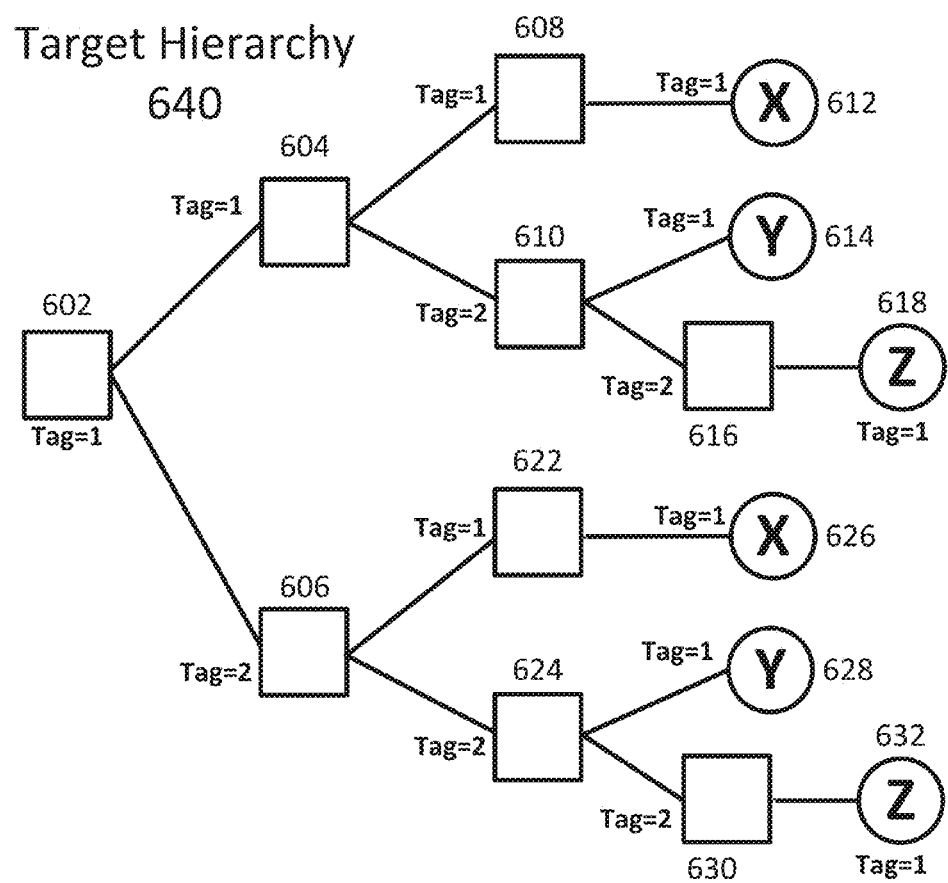

For example, consider the target hierarchy 640 of FIG. 6B that results from instancing. In FIG. 6B, target hierarchy 640 includes root node 602, internal nodes 604-610, 616, 622, 624, and 630, and leaf nodes 612, 614, 618, 626, 628, and 632. If leaf node 614 contained an absolute reference to node 618, instanced leaf node 628 would also contain an absolute reference to leaf node 618. An example of this absolute reference is "1, 1, 2, 2, 1." However, if leaf node 614 contained a relative reference to node 618, instanced leaf node 628 would contain a relative reference to leaf node 632. An example of this relative reference is "2, 1." This relative reference is interpreted as a path to be traversed starting from the parent of the leaf node where it is stored. In this example, the parent of node 628 is node 624. Traversing the path "2, 1" starting at node 624 results in a path to leaf node 632. In some examples, a flag or indicator is stored along with the reference to indicate whether the reference is a relative reference or an absolute reference.

Another feature of the system is the ability for relative reference to contain a special additional token called "Move to Parent." This may be interpreted as an instruction, rather than a tag. The instruction is to move up one level in the hierarchy while traversing the tree to compute the referent. This may be thought of as analogous to the special directory name " . . . " available in unix systems and file path names.

Figure 7:
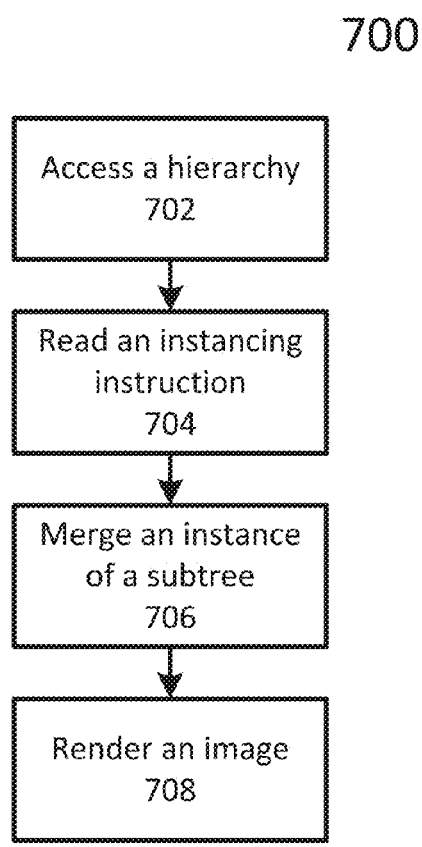
FIG. 7 illustrates an exemplary process for rendering three-dimensional images using a hierarchy.

FIG. 7 illustrates an exemplary process for rendering three-dimensional images by instancing scene description data using a hierarchy. At block 702, the hierarchy is accessed. The hierarchy comprises a first node. The first node is a predecessor to a first subtree of one or more nodes. In other words, the one or more nodes of the first subtree are the children and grandchildren of the first node. The first node is associated with a first scene description data object. Scene description data objects may include, for example, objects for geometry, virtual cameras, lighting rigs, light sources, light filters, materials, textures, and other visual effects. The hierarchy also comprises an instance node. The instance node is a leaf of the hierarchy. The instance node has a parent node and the instance node is associated with a second scene description data object. The parent node of the instance node has successor nodes other than the instance node. These successor nodes may be internal nodes and/or leaf nodes.

At block 704, an instancing instruction of the instance node is read. The instancing instruction comprises information identifying the first node. The instancing instruction may be a special tag and value of the instance node.

At block 706, an instance of the first subtree is merged. The instance of the first subtree of one or more nodes is merged at a location in the hierarchy of the instance node. Merging may include determining a conflict between (a) at least one node of the first subtree and (b) at least one node of the successor nodes other than the instance node of the parent node. Merging may also include overriding a first value of a property defined by the (b) at least one node of the successor nodes by using a second value of the property defined by the (a) at least one node of the first subtree.

A conflict may be determined by accessing a first tag of the (a) at least one node of the first subtree, wherein the first tag has a tag value, and accessing a second tag of the (b) at least one node of the successor nodes, wherein the second tag has the same tag value. Because the tag values are the same and the two nodes would otherwise be siblings, a conflict is determined between the two nodes. Generally speaking, tag values are used to uniquely identify sibling nodes in the hierarchy.

In some examples, the first node may also have a tag, such as a third tag. The information identifying the first node includes a path, which uses the third tag.

In some examples, the first subtree comprises a second node including a relative reference, the relative reference of the second node identifies a first identified node in the first subtree. The merged instance of the first subtree comprises a third node including the relative reference. The relative reference of the third node identifies a second identified node in the merged instance of the first subtree. The first identified node and the second identified node are not the same node.

In other examples, the first subtree comprises a second node including an absolute reference. The absolute reference of the second node identifies a first identified node in the first subtree. The merged instance of the first subtree comprises a third node including the absolute reference. The absolute reference of the third node identifies the first identified node in the first subtree.

In addition, the first subtree may comprise a fourth node, which includes data that comprises a parent token. The parent token indicates an instruction to move up one level in the hierarchy.

At block 708, an image is rendered based on the merged instance of the first subtree.

Figure 8:
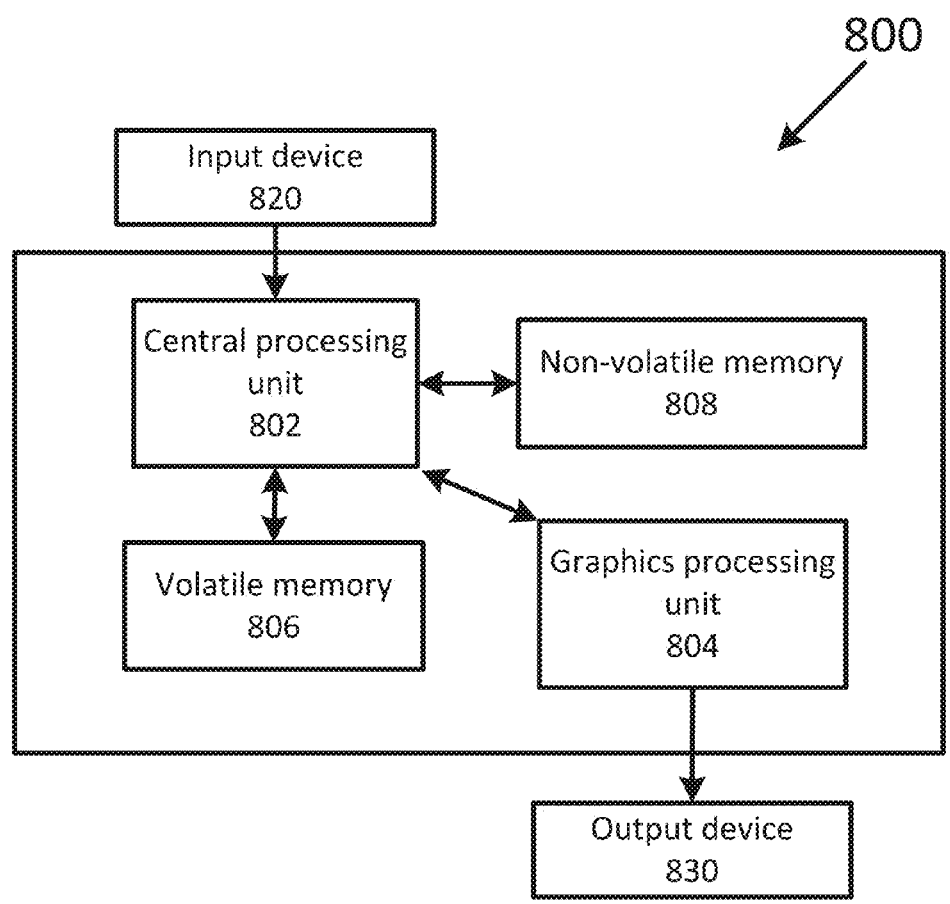
FIG. 8 illustrates an exemplary computing system.

FIG. 8 illustrates an exemplary animation system 800 that can be used to implement the hierarchy technique discussed above. The hierarchy technique can be implemented, for example, in either hardware or in software stored on a non-transitory computer-readable storage medium.

The animation system 800 can be configured to receive user input from an input device 820. The input device 820 can be any device that receives input from the user and transmits it to the animation system 800. For example, the input device 820 can be a keyboard, a mouse, a tablet, a stylus, or the like. Those skilled in the art will recognize that other types of input devices can also be used.

The animation system 800 can be configured to output graphics, images, or animation to an output device 830. The output device 830 can include any device that receives data from the animation system and presents the data to the user. For example, the output device 830 may include a liquid crystal display, a set of light-emitting diodes, a projector, or the like. Those skilled in the art will recognize that other types of output devices can also be used.

The animation system 800 may further include a central processing unit 802. The central processing unit may include one or more processing cores. The central processing unit 802 may be coupled to and able to communicate with the input device 820. Although the animation system 800 is illustrated with one central processing unit 802, the animation system 800 may include multiple processing units. The animation system 800 may also include a graphics processing unit 804. The graphics processing unit 804 may be dedicated to processing graphics-related data. The graphics processing unit 804 may include a single processing core or multiple processing cores. Although the animation system 800 is illustrated with one graphics processing unit 804, the animation system 800 may include a plurality of graphics processing units. The central processing unit 802 and/or the graphics processing unit 804 may be coupled to and able to communicate data to the output device 830.

In one example, the animation system 800 may include one or more processors and instructions stored in a non-transitory computer-readable storage medium, such as a memory or storage device, that when executed by the one or more processors, perform animation rendering using the hierarchy technique described above. In the context of the embodiments described herein, a "non-transitory computer-readable storage medium" can be any medium that can contain or store the program for use by or in connection with the instruction execution system, apparatus, or device. The non-transitory computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The animation system 800 may include volatile memory 806, which is a non-transitory computer-readable storage medium, in communication with the central processing unit 802. The volatile memory 806 may include, for example, random access memory, such as dynamic random access memory or static random access memory, or any other type of volatile memory. The volatile memory 806 may be used to store data or instructions during the operation of the animation system 800. Those skilled in the art will recognize that other types of volatile memory can also be used.

The animation system 800 may also include non-volatile memory 808, which is a non-transitory computer-readable storage medium, in communication with the central processing unit 802. The non-volatile memory 808 may include flash memory, hard disks, magnetic storage devices, read-only memory, or the like. The non-volatile memory 808 may be used to store animation data, render setup graph data, computer instructions, or any other information. Those skilled in the art will recognize that other types of non-volatile memory can also be used.

The animation system 800 is not limited to the devices, configurations, and functionalities described above. For example, although a single volatile memory 806, non-volatile memory 808, central processing unit 802, graphics processing unit 804, input device 820, and output device 830 are illustrated, a plurality of any of these devices can be implemented internal or external to the animation system 800. In addition, the animation system 800 may include a network access device for accessing information on a network, such as an internal network or the Internet. Those skilled in the art will recognize that other configurations of the animation system 800 can be used.

Various exemplary embodiments are described herein. Reference is made to these examples in a non-limiting sense. They are provided to more broadly illustrate applicable aspects of the disclosed technology. Various changes may be made and equivalents may be substituted without departing from the true spirit and scope of the various embodiments. In addition, many modifications may be made to adapt a particular situation, material, composition of matter, process, process act(s), or step(s) to the objective(s), spirit, or scope of the various embodiments. Further, as will be appreciated by those with skill in the art, each of the individual variations described and illustrated herein has discrete components and features that may be readily separated from or combined with the features of any of the other several embodiments without departing from the scope or spirit of the various embodiments.

What is claimed is:

1. A computer-implemented method for rendering three-dimensional images by instancing scene description data using a hierarchy, the method comprising:
   accessing the hierarchy, the hierarchy comprising:
   a first node, the first node being a predecessor to a first subtree of one or more nodes and the first node being associated with a first scene description data object;
   an instance node, the instance node being a leaf of the hierarchy, the instance node having a parent node, and the instance node being associated with a second scene description data object, and wherein the parent node has successor nodes other than the instance node;
   reading an instancing instruction of the instance node, the instancing instruction comprising information identifying the first node;
   merging an instance of the first subtree of one or more nodes at a location in the hierarchy of the instance node;
   determining a conflict between (a) at least one node of the first subtree and (b) at least one node of the successor nodes other than the instance node of the parent node;
   overriding a first value of a property defined by the (b) at least one node of the successor nodes by using a second value of the property defined by the (a) at least one node of the first subtree; and
   rendering an image based on the merged instance of the first subtree.

2. The computer-implemented method of claim 1, wherein merging further comprises:
   determining the conflict by:
   accessing a first tag of the (a) at least one node of the first subtree, the first tag having a tag value;
   accessing a second tag of the (b) at least one node of the successor nodes, the second tag having the tag value; and
   wherein tag values uniquely identify sibling nodes in the hierarchy.

3. The computer-implemented method of claim 2, wherein:
   the first node has a third tag;
   the information identifying the first node comprises a path; and
   the path includes the third tag of the first node.

4. The computer-implemented method of claim 1, wherein:
   the first subtree comprises a second node including a relative reference, the relative reference of the second node identifying a first identified node in the first subtree;
   the merged instance of the first subtree comprises a third node including the relative reference, the relative reference of the third node identifying a second identified node in the merged instance of the first subtree; and
   wherein the first identified node and the second identified node are not the same node.

5. The computer-implemented method of claim 1, wherein:
   the first subtree comprises a second node including an absolute reference, the absolute reference of the second node identifying a first identified node in the first subtree; and the merged instance of the first subtree comprises a third node including the absolute reference, the absolute reference of the third node identifying the first identified node in the first subtree.

6. The computer-implemented method of claim 1, wherein: the first subtree comprises a fourth node including data that comprises a parent token, the parent token indicating an instruction to move up one level in the hierarchy.

7. A non-transitory computer-readable storage medium comprising computer-executable instructions for rendering three-dimensional images by instancing scene description data using a hierarchy, the computer-executable instructions comprising instructions for:
   accessing the hierarchy, the hierarchy comprising:
      a first node, the first node being a predecessor to a first subtree of one or more nodes and the first node being associated with a first scene description data object;
      an instance node, the instance node being a leaf of the hierarchy, the instance node having a parent node, and the instance node being associated with a second scene description data object, and wherein the parent node has successor nodes other than the instance node;
   reading an instancing instruction of the instance node, the instancing instruction comprising information identifying the first node;
   merging an instance of the first subtree of one or more nodes at a location in the hierarchy of the instance node;
   determining a conflict between (a) at least one node of the first subtree and (b) at least one node of the successor nodes other than the instance node of the parent node; and
   overriding a first value of a property defined by the (b) at least one node of the successor nodes by using a second value of the property defined by the (a) at least one node of the first subtree; and
   rendering an image based on the merged instance of the first subtree.

8. The non-transitory computer-readable storage medium of claim 7, wherein merging further comprises instructions for:
   determining the conflict by:
      accessing a first tag of the (a) at least one node of the first subtree, the first tag having a tag value;
      accessing a second tag of the (b) at least one node of the successor nodes, the second tag having the tag value; and
      wherein tag values uniquely identify sibling nodes in the hierarchy.

9. The non-transitory computer-readable storage medium of claim 8, wherein:
   the first node has a third tag;
   the information identifying the first node comprises a path; and
   the path includes the third tag of the first node.

10. The non-transitory computer-readable storage medium of claim 7, wherein:
   the first subtree comprises a second node including a relative reference, the relative reference of the second node identifying a first identified node in the first subtree;
   the merged instance of the first subtree comprises a third node including the relative reference, the relative reference of the third node identifying a second identified node in the merged instance of the first subtree; and
   wherein the first identified node and the second identified node are not the same node.

11. The non-transitory computer-readable storage medium of claim 8, wherein:
   the first subtree comprises a second node including an absolute reference, the absolute reference of the second node identifying a first identified node in the first subtree; and
   the merged instance of the first subtree comprises a third node including the absolute reference, the absolute reference of the third node identifying the first identified node in the first subtree.

12. The non-transitory computer-readable storage medium of claim 7, wherein:
   the first subtree comprises a fourth node including data that comprises a parent token, the parent token indicating an instruction to move up one level in the hierarchy.

13. An apparatus for rendering three-dimensional images by instancing scene description data using a hierarchy, the apparatus comprising:
   a memory configured to store the hierarchy; and
   one or more computer processors configured to:
      access the hierarchy, the hierarchy comprising:
         a first node, the first node being a predecessor to a first subtree of one or more nodes and the first node being associated with a first scene description data object;
         an instance node, the instance node being a leaf of the hierarchy, the instance node having a parent node, and the instance node being associated with a second scene description data object, and wherein the parent node has successor nodes other than the instance node;
      read an instancing instruction of the instance node, the instancing instruction comprising information identifying the first node;
      merge an instance of the first subtree of one or more nodes at a location in the hierarchy of the instance node;
      determine a conflict between (a) at least one node of the first subtree and (b) at least one node of the successor nodes other than the instance node of the parent node; and
      override a first value of a property defined by the (b) at least one node of the successor nodes by using a second value of the property defined by the (a) at least one node of the first subtree; and
      render an image based on the merged instance of the first subtree.

14. The apparatus of claim 13, the one or more computer processors further configured to:
   determine the conflict by:
      accessing a first tag of the (a) at least one node of the first subtree, the first tag having a tag value;
      accessing a second tag of the (b) at least one node of the successor nodes, the second tag having the tag value; and
      wherein tag values uniquely identify sibling nodes in the hierarchy.

15. The apparatus of claim 14, wherein:
   the first node has a third tag;
   the information identifying the first node comprises a path; and
   the path includes the third tag of the first node.

16. The apparatus of claim 13, wherein:
   the first subtree comprises a second node including a relative reference, the relative reference of the second node identifying a first identified node in the first subtree;

the merged instance of the first subtree comprises a third node including the relative reference, the relative reference of the third node identifying a second identified node in the merged instance of the first subtree; and wherein the first identified node and the second identified node are not the same node.

17. The apparatus of claim 13, wherein:

the first subtree comprises a second node including an absolute reference, the absolute reference of the second node identifying a first identified node in the first subtree; and the merged instance of the first subtree comprises a third node including the absolute reference, the absolute reference of the third node identifying the first identified node in the first subtree.

18. The apparatus of claim 13, wherein:

the first subtree comprises a fourth node including data that comprises a parent token, the parent token indicating an instruction to move up one level in the hierarchy.

\* \* \* \* \*